May 27, 1924.
H. E. WARREN
SELF STARTING SYNCHRONOUS MOTOR
Filed Dec. 12, 1921
1,495,827
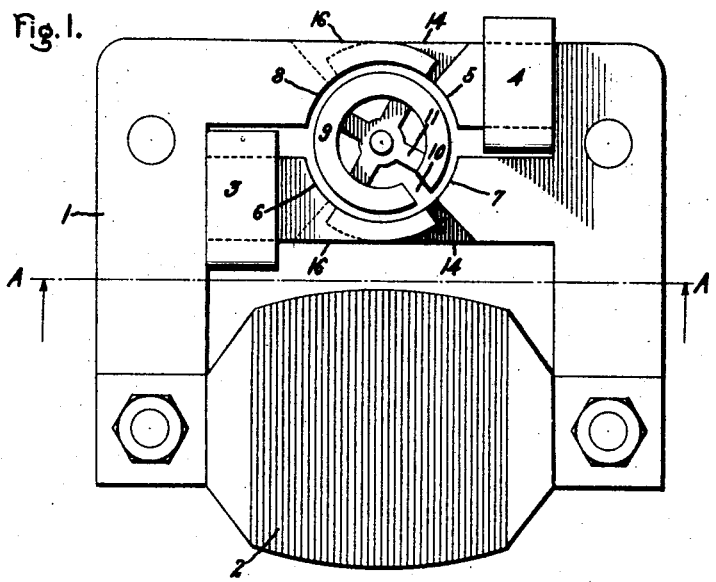
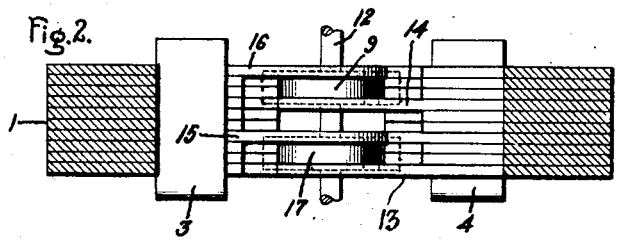
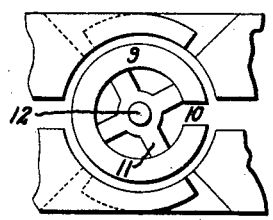
Inventor:
Henry E. Warren
by Albert G. Davis
His Attorney, Patented May 27, 1924.

1,495,827

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

SELF-STARTING SYNCHRONOUS MOTOR.

Application filed December 12, 1921. Serial No. 521,590.

*To all whom it may concern:*

Be it known that I, HENRY E. WARREN, a citizen of the United States, residing at Ashland, county of Middlesex, State of Massachusetts, have invented certain new and useful Improvements in Self-Starting Synchronous Motors, of which the following is a specification.

This invention relates to self-starting synchronous motors of the general type shown and described in my U. S. Patents No. 1,283,432, patented October 26, 1918 and No. 1,283,433, patented October 29, 1918, in which a magnetic member is caused to rotate by the influence of a rotating magnetic field.

The self-starting synchronous motors, such as described in the above-mentioned patents, use for the rotating element a rotor made up of two elements, the function of one of the elements of the motor being to start the rotor from rest and the other to maintain as strong torque as possible at synchronous speeds. In the present application I describe a synchronous motor of the self-starting type in which a single element combines both functions above mentioned in a very efficient manner.

The rotor of the self-starting synchronous motor of the present application preferably consists of one or more rings of permanent magnet steel having short gaps in one side thereof. This construction enables a single rotor element to have strong starting characteristics as well as strong synchronizing characteristics.

The novel features of my invention will be pointed out in the appended claims while the invention itself and manner of operation will be understood more fully from the following description, taken in connection with the accompanying drawing, in which Fig. 1 is a side view of the motor; Fig. 2 a sectional view of the upper part of Fig. 1 taken on the line A—A of Fig. 1, and Fig. 3 is a side view showing the rotor element in a position differing from that shown in Fig. 1.

Referring to Fig. 1, I have shown a type of self-starting synchronous motor in which a bipolar field magnet 1, constituting the stator for the motor, is provided with an energizing coil 2 and with shading coils 3 and 4 for causing a time lag of the magnetic intensity in the pole faces 5 and 6, behind that in the pole faces 7 and 8. The rotor element 9 preferably consists of one or more rings of permanent magnet steel having short gap openings 10. The rings are mounted on a spider 11 firmly fastened to the shaft 12. In a rotor constructed in this manner the reluctance to the path of magnetic lines is least when the gap 10 is in the densest portion of the magnetic field and in a steady field the rotor will naturally take this position of rest. Such a position is shown in Fig. 3. Under these conditions the total reluctance is due primarily to the air gap between the ring 9 and the north and south poles of the field. In Fig. 1 where the rotor is shown displaced out of this position, the total reluctance is made up of the air gap around the ring plus the reluctance of the opening 10 of the ring itself. This added reluctance is not symmetrical and there will be a strong tendency for the ring to rotate into the position shown in Fig. 3.

These statements are true whether the ring is made of soft steel or hardened steel and I have found that in a steady field the tendency of the hardened steel ring to return to the position shown in Fig. 3 is very strong until the ring has been rotated more than 90 degrees in either direction. In a soft steel ring without any tendency to retain magnetism similar to that of a permanent magnet there is a tendency for the ring to remain in unstable equilibrium after it has been turned 90 degrees in either direction from the position shown in Fig. 3, because then there is an equal tendency for the gap 10 to move either to the right or to the left. This would be true if the ring had two gaps 180 degrees apart, but such a construction might be less desirable for a rotor on account of mechanical weaknesses, and the extra expense of mounting. When the ring is mounted in an alternating current field, which has rotating characteristics as shown in Fig. 1 due to the shading coils 3 and 4, there is a very strong tendency for rotation to be set up principally on account of the remanent magnetism which tends to persist in the ring. The torque which is thus developed will move the gap away from the position which it would hold if the field were stationary and obviously, if the torque which tends to cause rotation is greater than the opposing torques due to the gap in the ring, rotation will be set up and the ring will be brought quickly up to synchronous speed. When synchronous speed is reached, the gap following the field will always tend to maintain the same relation with respect to the rotating field and will resist any angular displacement with respect to this field just as it does in a steady field. Such a rotor will therefore be able to develop considerable power.

In order that the tendency to cause rotation when the rotor is at rest shall be greater than the resistance to the tendency due to the fact that the ring is unsymmetrical, I make the field structure as illustrated in the figures. This field is built up of laminations as shown in Fig. 2 and has polar projections 5, 6, 7 and 8 in which all the laminations are used as better shown in Fig. 2. There is a very considerable air gap from the solid pole piece 5 to the solid pole piece 8 and likewise between pole pieces 6 and 7. Across this air gap a few of the laminations are allowed to overlap as 13 and 14 from the right-hand portion of the field and 15 and 16 from the left-hand portion. A suitable air gap is provided between and around these overlapping laminations so as not to short-circuit the opposite sides of the field and so as to leave a zone around the rotor 9 in which the magnetic lines from one pole are somewhat mixed with the magnetic lines from the opposite pole. The magnetism in poles 5 and 6 lag somewhat behind that in the unshaded poles 7 and 8, but this angle of lag is considerably less than 90 degrees. Owing, however, to the mixed magnetism in the zone where the laminations overlap, there is tendency to produce there a field which lags still further behind that in 5 because the lag of the pole 8 is 180 degrees behind 7. Moreover, in this zone of overlapping laminations, there is an opportunity for selective action between the polarized ring 9 and the magnetism of the field. This overlapping zone, furthermore, produces a much more even gradient of magnetic force around the ring. For all of these reasons, the starting torque of the cut ring is increased far beyond the tendency of the gap in the ring to remain where the field is most intense. Consequently it is set into rotation, comes up to synchronism and is able to develop considerable power at synchronous speed.

With this construction it is feasible to use several rings on the same shaft or a wide band of the same shape provided the rotor does not furnish too easy a path for magnetism of the field. In order for the rotor to function effectively it is desirable to maintain a very high intensity of magnetism therethrough. If the reluctance of the rotor is too low there will not be a sufficient difference of magnetic potential from point to point on its circumference to properly magnetize it when it is started. I have found that very good results are obtained by using several rings 9 and 17 arranged at a moderate axial distance apart, such as illustrated in Fig. 2, so that each one may drain the magnetic line from a considerable width of the pole faces. In this manner an adequate intensity of magnetism may be maintained in all the rings. If the field's strength is increased the rings may be brought closely together and in a sufficiently strong field they may be very close together.

In the construction described the rotor has been illustrated rotating in a bipolar field, but the principle will apply equally well in a multi-polar field. In a bipolar field or in a multi-polar field where several rings are used the several gaps may be arranged in a line or spaced the same angular distance apart as the poles of the field.

In the construction described the overlapping laminations produce a more nearly circular rotating field than the usual construction where the overlapping portions are omitted. Furthermore, with the type of construction shown in the present application there is nothing to prevent multiplication of power by the addition of more rotors in a deeper field or by increasing the diameters of the rotors in a larger field. Thus it is evident that this type of self-starting motor may be made to have considerable more power both for starting and for synchronous operation than has heretofore been possible in this general type of motor. In some cases it might be desirable to leave a web extending across the cut-away portion of the ring to strengthen the ring mechanically, the web being sufficiently thin so as not to interfere with the reluctance caused by the cut-away portion, or I might in certain cases use a bridge of non-magnetic material for this purpose which at the same time balances the ring.

In accordance with the provisions of the patent statutes, I have described the principle of operation of my invention, together with the particular method which I now consider to be the best manner for carrying it out, but I desire to have it understood that the particular method disclosed is only illustrative, and that the invention may be carried out with such modifications as come within the true scope and spirit of the appended claims.

What I claim as new and desire to secure by Letters Patent of the United States, is,—

1. A self-starting synchronous motor provided with means for producing a rotating magnetic field and having a rotor consisting of one or more magnetically discontinuous rings of magnetic material.

2. A self-starting synchronous motor provided with means for producing a substantially circular rotating magnetic field and having a rotor provided with one or more rings of permanent magnet steel, said ring or rings being provided with one or more short gaps.

3. A self-starting synchronous motor provided with means for producing a substantially circular, rotating magnetic field and a rotor for said motor comprising a plurality of spaced rings of permanent magnet steel, said rings being magnetically discontinuous.

4. A self-starting synchronous motor comprising a laminated field magnet provided with an exciting winding and cooperating, partially shaded polar projections having spaced, overlapping laminations extending from the faces thereof for producing a mixed field between the shaded and unshaded portions of adjacent pole faces, and a rotor between said pole faces, said rotor comprising one or more magnetically discontinuous rings of permanent magnet steel mounted on a shaft.

5. A self-starting synchronous motor provided with means for producing a substantially circular rotating magnetic field and a rotor comprising a magnetically discontinuous band of hardened steel.

6. A self-starting synchronous motor comprising a field magnet, an exciting winding on said magnet for producing an alternating flux therein, cooperating polar projections on said magnet, a hardened steel, magnetically discontinuous ring rotor mounted between said polar projections, and means associated with said polar projections for changing said alternating flux into a substantially circular, rotating magnetic field concentric with said rotor.

7. A rotor for a self-starting synchronous motor consisting of one or more magnetically discontinuous rings of permanent magnet steel.

8. A self-starting synchronous motor of the type in which a magnetic structure is provided with partially shaded polar projections and an alternating current exciting winding, for producing a rotating magnetic field which acts upon a rotor element, characterized by the fact that the polar projections are provided with spaced magnetic projections which overlap between the shaded and unshaded portions of adjacent pole pieces for producing a substantially even gradient of magnetic force around said rotor element.

9. A field structure for a self-starting synchronous motor provided with an exciting winding and cooperating faced polar projections adapted to receive a rotor element, portions of the laminations being extended beyond the polar faces so as to form an interleaved air gap therebetween.

10. In a self-starting synchronous motor, a field magnet having cooperating polar projections adapted to partially surround a rotor element, means for producing an alternating flux in said magnet, shading coils on said polar projections for changing said alternating flux into an elliptic rotating magnetic field and means associated with said polar projections for changing said elliptic rotating magnetic field into a substantially circular rotating magnetic field.

11. A self-starting synchronous motor comprising a rotor member made up of one or more rings each having strong starting and synchronizing characteristics, and a field structure for producing a substantially circular rotating magnetic field in said rotor, said structure comprising a laminated magnet provided with an exciting winding and spaced cooperating polar projections, a shading coil on said projections and laminations extending from said projections adapted to form a spaced interleaved magnetic path between adjacent poles which together with said projections completely encircles said rotor, the flux distribution therein being such as to produce a high magnetic density in said rotor ring or rings.

12. In a self-starting synchronous motor, means for producing a rotating magnetic field, a magnetically unsymmetrical, hardened steel, ring rotor for said motor, said rotor having strong starting characteristics due to remanent magnetism and having strong synchronizing characteristics due to said unsymmetrical feature, said feature also causing said rotor to seek a definite position with respect to a point of maximum flux density in said field, and means for distributing the flux of said rotating field in such a manner as to cause the starting characteristics of said rotor to predominate over the tendency of said rotor to remain in said definite position.

In witness whereof, I have hereunto set my hand this 5th day of December, 1921.

HENRY E. WARREN.